United States Patent
Krieg et al.

(10) Patent No.: US 6,777,668 B2
(45) Date of Patent: Aug. 17, 2004

(54) METHOD AND APPARATUS FOR THE ADHESIVE BONDING OF A SENSOR ASSEMBLY BACKING PLATE TO A VEHICLE WINDOW

(75) Inventors: Karl-Heinz Krieg, Erkenbrechtsweiler (DE); Martin Krug, Karlsruhe (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/809,435

(22) Filed: Mar. 16, 2001

(65) Prior Publication Data

US 2001/0052568 A1 Dec. 20, 2001

(30) Foreign Application Priority Data

Mar. 16, 2000  (DE) .......................................... 100 12 976

(51) Int. Cl.$^7$ ............................. C09J 0/00; B32B 31/00
(52) U.S. Cl. ....................................... 250/239; 250/216
(58) Field of Search ................................. 250/239, 216; 156/275.5, 195

(56) References Cited

U.S. PATENT DOCUMENTS 5,110,387 A * 5/1992 Jasinski et al. ............. 156/222
6,284,360 B1 * 9/2001 Johnson et al. ........... 428/317.7
6,355,127 B1 * 3/2002 Mahdi et al. ................ 156/155

FOREIGN PATENT DOCUMENTS

| DE | 3043034 | 5/1981 |
|---|---|---|
| DE | 4124766 | 12/1992 |
| EP | 0936096 | 8/1999 |
| WO | 96/21568 | 7/1996 |

* cited by examiner

*Primary Examiner*—Scott J. Sugarman
*Assistant Examiner*—Richard Hanig
(74) *Attorney, Agent, or Firm*—Crowell & Moring LLP

(57) ABSTRACT

A method and apparatus are provided for adhesive bonding of a backing plate for a sensor assembly to a vehicle window, especially a windscreen of a passenger car or truck. The backing plate has an adhesive layer and is heated at least in the area of the adhesive layer by a heating device until the adhesive layer is softened sufficiently to carry out adhesive bonding. The backing plate is transferred into a contact pressure device and the contact pressure device presses the backing plate with the adhesive layer on to the vehicle window for a predetermined length of time. In order to improve the usability of such a method in the context of mass production, it is provided that the heating device emits infrared radiation, heating of the adhesive layer being carried out until it has softened sufficiently by positioning the backing plate with the adhesive layer facing the heating device at a close spacing for a predetermined length of time.

26 Claims, 1 Drawing Sheet

METHOD AND APPARATUS FOR THE ADHESIVE BONDING OF A SENSOR ASSEMBLY BACKING PLATE TO A VEHICLE WINDOW

BACKGROUND OF THE INVENTION

This application claims the priority of German application No.10012976.5-43, filed Mar. 16, 2000, the disclosure of which is expressly incorporated by reference herein.

The invention relates to a method and apparatus for the adhesive bonding of a sensor assembly backing plate to a vehicle window, especially to a windscreen of a vehicle, for example a passenger car, a truck, an aircraft or a ship.

Preferred embodiments of the invention relate to a method for the adhesive bonding of a backing plate for a sensor assembly to a vehicle window, especially a windscreen of a passenger car or truck, the backing plate having an adhesive layer and being heated at least in the area of the adhesive layer by a heating device until the adhesive layer is sufficiently softened for the formation of an adhesive bonded connection, the backing plate being transferred into a contact pressure device, the contact pressure device pressing the backing plate with the adhesive layer on to the vehicle window for a predetermined length of time.

In modern passenger cars a sensor assembly containing a light sensor, a rain sensor or distance measuring device, for example, may be fitted to the windscreen. To do this, the sensor assembly or constituent parts thereof are mounted on at least one backing plate, which is in turned fixed to the windscreen by adhesive bonding. For this purpose the backing plate is furnished on one side with an adhesive layer, which must first be heated in order to form an adhesive bonded connection. Such an adhesive layer may consist, for example, of a double-sided, transparent silicone adhesive pad. In order to prevent contamination of the adhesive layer, this is provided with a protective film, which must be removed before adhesive bonding of the backing plate to the windscreen. This protective film generally takes the form of a so-called "liner". At present adhesive bonding of the backing plate is performed as follows:

A number of backing plates are provided in a storage container. The backing plates are individually and manually taken from the storage container and placed in an oven. In the oven a number of carrier plates and hence their respective adhesive layer are heated until the adhesive layer is sufficiently softened for adhesive bonding. This heating process has hitherto taken approximately 50 minutes in such an oven. The backing plate is then taken manually out of the oven, following which the protective film must be manually removed before the backing plate is inserted or transferred into a contact pressure device. Finally this contact pressure device presses the backing plate on to the vehicle window for a predetermined length of time. This method currently employed requires a relatively large proportion of manual operations, which call for great care, for example when stripping off the protective film. The entire process from taking the backing plate out of the storage container to completion of the contact pressure sequence to form the adhesive bonded connection currently takes approximately 1 hour. This known method is consequently labor-intensive and unsuitable for series production as part of a mass production process.

The present invention addresses the problem of designing a method of the aforementioned type in such a way that it can be used in the context of mass production.

According to the invention this problem is solved by a method of the above referred to type, wherein the heating device has a heater operable to emit infrared radiation, heating of the layer of adhesive being carried out until it has softened sufficiently by positioning the backing plate with the adhesive layer facing the heater relatively close to the heater for a predetermined length of time.

By using means for the emission of infrared radiation it is possible, in a relatively short time, to heat the adhesive layer so that sufficient softening occurs to carry out the adhesive bonding. In order to achieve such brief, intensive heating, the backing plate is positioned in front of the infrared emitter/radiator so that the adhesive layer is facing the infrared emitter/radiator and situated at a relatively short distance therefrom. The transmission of heat energy by means of infrared radiation over a relatively short distance is referred to as "Near Infrared technology" or "NIR technology". The time taken for sufficient softening of the adhesive layer can consequently be reduced to approximately 20 seconds. The method according to the invention can accordingly be carried out with sufficient speed to be used in the context of mass production.

According to an advantageous embodiment the backing plates can be preheated by means of a preheating device before transferring them to the heating device. The said preheating of the backing plates is preferably carried out at a time when the backing plates are still in their storage container. The NIR technology used to heat the backing plates to a predetermined temperature, possibly through a transparent wall of the storage container or a wall transmitting NIR radiation, is also suitable for this preheating. The preheating temperature may be 40° C., for example.

In an advantageous development a protective film, which is applied to the adhesive layer of the backing plate, is removed by the heating device prior to heating of the layer of adhesive. In this way damaging and contamination of the softened layer of adhesive due to stripping-off or removal of the protective film can be prevented. When removing the protective film, the risk of damage or contamination of the adhesive layer is significantly reduced if the adhesive layer has not yet been heated.

According to an especially advantageous embodiment the protective film is affixed to the storage container in such a way that the protective film is automatically stripped off the adhesive layer as the backing plate is taken out. This measure obviates the need for careful handling in order to remove the protective film, so that this process can be performed with less care and hence carried out mechanically, for example by a robotic arm. According to a development the protective film can be adhesively bonded to the storage container, for example, in order to produce the above-mentioned affixing. In another embodiment the protective film can be adhesively bonded to a film substrate, the film substrate in turn being detachably fixed to the storage container. This detachable fixing can be achieved in particular by clipping the film substrate to the storage container. This measure greatly facilitates reuse of the storage containers.

According to a particularly advantageous embodiment, the adhesive layer can be heated until it is sufficiently softened by routing the traverse path for transferring the backing plate into the contact pressure device along the aforementioned means for the emission of infrared radiation. In this way the adhesive layer is exposed to the infrared radiation for the predetermined length of time, so that the requisite heat energy transfer coincides with transfer of the backing plate into the contact pressure device. This measure affords improved process control.

The length of time required from taking the backing plate out of the storage container to completion of the contact pressure sequence for pressing the backing plate on to the vehicle window can be reduced to approximately 1 minute, particularly with the provision of preheating.

Further important features and advantages of the method according to the invention will follow from the subordinate claims, from the drawings and from the associated description of the figures referring to the drawing.

It goes without saying that the aforementioned features and those still to be explained below may be used not only in each of the combinations specified but also in other combinations or in isolation without departing from the scope of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
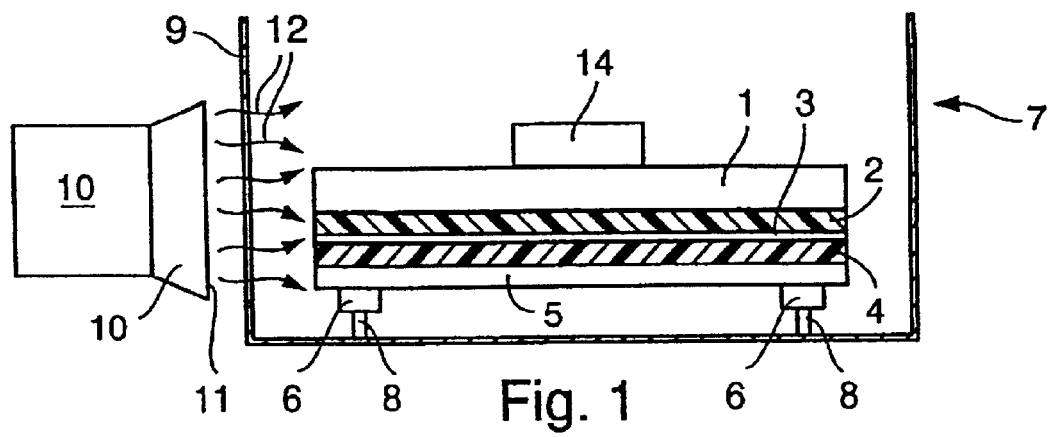
FIG. 1 shows a schematic representation of an assembly including a preheating device constructed according to preferred embodiments of the invention.

According to FIG. 1, a backing plate 1 has an adhesive layer 2 on one side, which is composed, for example, of silicone or a silicone film and which must be softened by heating in order to carry out adhesive bonding. A protective film or a liner 3 is applied to the adhesive layer 2 which is intended to protect the adhesive layer 2 against contamination until such time as the backing plate 1 is affixed to a vehicle window 20, especially a windscreen 20 represented schematically in FIG. 3, of an (otherwise not shown) vehicle.

According to the embodiment represented in FIG. 1, the protective film 3 is adhesively bonded to a film substrate 5 by means of an adhesive bonding 4. The film substrate 5 is detachably fixed in a storage container 7 by means of fixing 6, for which purpose the means of fixing 6 on the substrate side interact with means of fixing 8 on the container side, preferably in the nature of a clip connection. In this way the protective film 3 is indirectly fixed in or to the storage container 7 by way of the film substrate 5.

A number of these backing plates 1 for processing or assembly are preferably provided in the storage container 7. FIG. 1, however, shows only one backing plate 1. A preheating device 10, which functions on the NIR principle, i.e. by infrared radiation technology, is arranged close to a transparent wall 9 of the storage container 7. The preheating device 10 emits infrared radiation, symbolized by arrows 12, at a radiation outlet 11 facing the contents of the storage container 7. This infrared radiation 12 passes through the transparent or partially cut-out wall 9 and strikes the backing plate 1, thereby preheating and pre-softening the latter. The said preheating can be applied up to a temperature of approximately 40° C., for example.

Figure 2:
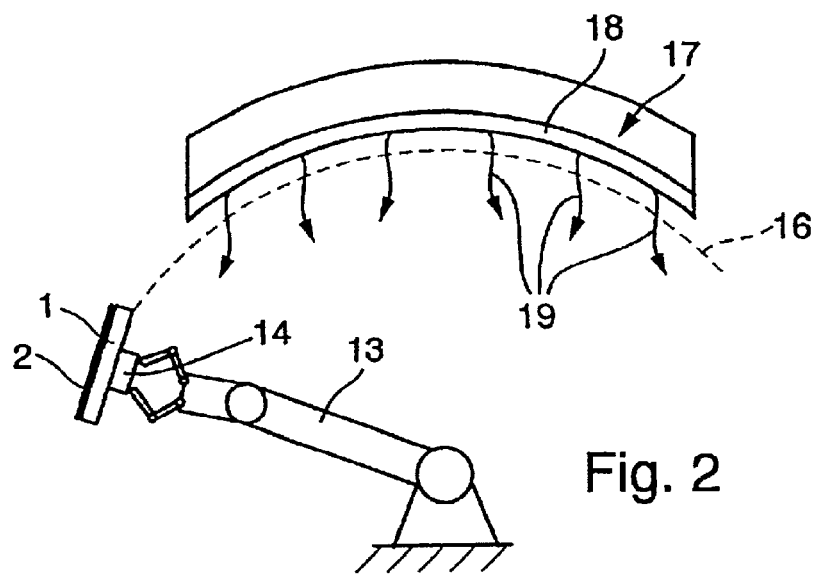
FIG. 2 shows a schematic representation of a heating device constructed according to preferred embodiments of the invention.

In order to take the preheated backing plate 1 out, a robotic arm 13 shown in FIG. 2 grips the backing plate 1, for example at a contour 14 suitable for this purpose. In taking the backing plate 1 out the protective film 3 remains in the storage container 7, since the protective film 3 is affixed to the film substrate 5 and this is in turn affixed to the storage container 7. Accordingly the protective film 3 is automatically removed from the adhesive layer 2 when the backing plate 1 is taken out.

Figure 3:
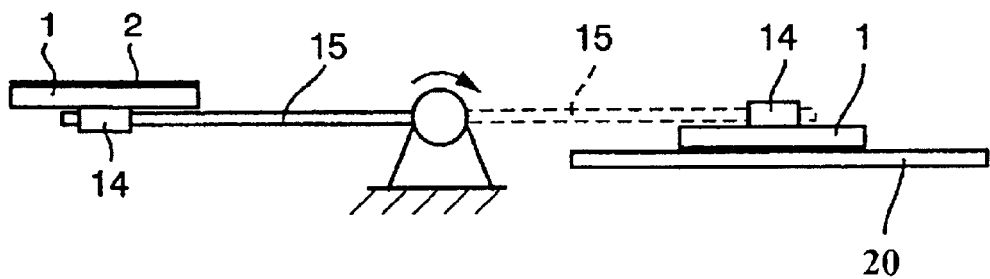
FIG. 3 shows a schematic representation of a contact pressure device constructed according to preferred embodiments of the invention.

The robotic arm 13 transfers the preheated backing plate 1 from the storage container 7 to a contact pressure device 15 represented symbolically in FIG. 3. According to FIG. 2 a traverse path 16, symbolized by a broken line, for the transfer of the backing plate 1 is routed along a heating device 17 such that the adhesive layer 2 of the backing plate 1 faces the said heating device 17. The heating device 17 has means of radiation 18 or means that serve for emitting infrared radiation. This infrared radiation is symbolized by arrows 19 in FIG. 2. Here too, NIR technology is used, that is to say the adhesive layer 2 is positioned relatively close to the means of radiation 18, for example at a distance of approximately 100 to 200 mm, in order to produce a heat energy transfer by the infrared radiation 19 over a short distance.

Instead of non-transitional heating to the point of softening of the adhesive layer 2, as represented in FIG. 2, in conjunction with transfer to the contact pressure device 15, a separate station may also be provided, in which the adhesive layer 2 is statically positioned in proximity to the means of radiation 18 throughout. The NIR technology means that heating of the adhesive layer 2 can progress so far in 20 seconds that sufficient softening of the adhesive layer occurs for adhesive bonding to be carried out. The adhesive layer 2 is heated to a temperature of 80° to 100° C., for example.

According to FIG. 3 the contact pressure device 15 finally causes the backing plate 1 with its adhesive layer 2 to be pressed on to that point on the windscreen 20 intended for this purpose. Once the adhesive layer 2 has cooled, the adhesive bonded connection is formed and the backing plate 1 is adhesively bonded to the vehicle window 20. Since the vehicle window 20 is relatively cold compared to the pressed-on adhesive layer 2, cooling and adhesive bonding take place relatively rapidly, so that the contact pressure sequence can be completed in as little as 1 second, for example. The position of the contact pressure device 15 when pressing the backing plate 1 on to the vehicle window 20 is represented by broken lines in FIG. 3.

It will be clear that corresponding measures and devices are made available to provide the backing plates 1 in the storage containers 7 on the inlet side of this adhesive bonding method and to convey the vehicle windows 20 with backing plates 1 bonded thereto away from the area of the contact pressure device 15 on the outlet side.

The robot suitably measures and precisely positions itself by means of optical markings on the windscreen and in the subsequent operation presses the backing plate 1 on to the screen 20 without the additional contact pressure device 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Method for the adhesive bonding of a backing plate for a sensor assembly to a vehicle window, especially a windscreen of a passenger car or truck, the backing plate having an adhesive layer and being heated at least in the area of the adhesive layer by a heating device until the adhesive layer is sufficiently softened for the formation of an adhesive bonded connection, the backing plate being transferred into a contact pressure device, the contact pressure device pressing the backing plate with the adhesive layer on to the vehicle window for a predetermined length of time,
wherein the heating device has a heater operable to emit infrared radiation, heating of the layer of adhesive being carried out until it has softened sufficiently by positioning the backing plate with the adhesive layer facing the heater relatively close to the heater for a predetermined length of time, and
wherein the backing plate is preheated by a preheating device before being transferred to the heating device.

2. Method according to claim 1, wherein, before it is transferred to the heating device, the backing plate is arranged in a storage container, in which at least one backing plate is provided.

3. Method according to claim 1, wherein the adhesive layer of the backing plate is provided with a protective film, which is removed prior to softening of the adhesive layer by the heating device.

4. Method according to claim 2, wherein the adhesive layer of the backing plate is provided with a protective film, which is removed prior to softening of the adhesive layer by the heating device.

5. Method according to claim 4, wherein the protective film is affixed to the storage container in such a way that the protective film is automatically stripped from the adhesive layer when the backing plate is taken out of storage container.

6. Method according to claim 5, wherein the protective film is adhesively bonded to the storage container.

7. Method according to claim 5, wherein the protective film is adhesively bonded to a film substrate, which is detachably fixed to the storage container, especially by clipping.

8. Method according to claim 1, wherein the contact pressure device has a robotic arm, which positions the backing plate at the heater of the heating device serving to emit infrared radiation, before it is pressed on to the vehicle window.

9. Method for the adhesive bonding of a backing plate for a sensor assembly to a vehicle window, especially a windscreen of a passenger car or truck, the backing plate having an adhesive layer and being heated at least in the area of the adhesive layer by a heating device until the adhesive layer is sufficiently softened for the formation of an adhesive bonded connection, the backing plate being transferred into a contact pressure device, the contact pressure device pressing the backing plate with the adhesive layer on to the vehicle window for a predetermined length of time,
wherein the heating device has a heater operable to emit infrared radiation, heating of the layer of adhesive being carried out until it has softened sufficiently by positioning the backing plate with the adhesive layer facing the heater relatively close to the heater for a predetermined length of time, and
wherein heating of the adhesive layer is carried out until it is sufficiently softened by routing a traverse path for transferring the backing plate into the contact pressure device along the heater, so that the adhesive layer is exposed to the infrared radiation.

10. Method of bonding a sensor assembly backing plate having an adhesive layer to a vehicle window comprising:
heating the adhesive layer by infrared radiation, and
preheating the backing plate and adhesive layer at a separate location from and prior to said heating step,
pressing the backing plate with the adhesive layer onto a vehicle window surface.

11. Method according to claim 10, wherein said heating includes:
placing the backing plate with the adhesive layer at a close spacing from a heating device operable to emit infrared radiation, and
operating the heating device to emit infrared radiation for a predetermined time period.

12. Method according to claim 11, wherein said predetermined time period is less than one minute.

13. Method according to claim 12, wherein said predetermined time period is less than 30 seconds.

14. Method according to claim 13, wherein said predetermined time period is approximately 20 seconds.

15. Method according to claim 10, wherein said preheating includes use of infrared radiation.

16. Method of bonding a sensor assembly backing plate having an adhesive layer to a vehicle window comprising:
storing said backing plate in a storage container;
preheating the backing plate while it is in said storage container;
moving the backing plate away from the storage container to a location where heating of the adhesive layer is carried out;
heating the adhesive layer by infrared radiation, and
pressing the backing plate with the adhesive layer onto a vehicle window surface.

17. Method according to claim 16, wherein the adhesive layer of the backing plate is provided with a protective film, which is removed prior to softening of the adhesive layer by the heating device.

18. Method according to claim 17, wherein the protective film is affixed to the storage container in such a way that the protective film is automatically stripped from the adhesive layer when the backing plate is taken out of storage container.

19. Method according to claim 18, wherein the protective film is adhesively bonded to the storage container.

20. Method according to claim 18, wherein the protective film is adhesively bonded to a film substrate, which is detachably fixed to the storage container, especially by clipping.

21. Method according to claim 20, comprising using a robot device to move the backing plate from the storage container to the heating device and to a pressing device operable to carry out said pressing onto a vehicle window.

22. Apparatus for bonding a sensor assembly backing plate having an adhesive layer to a vehicle window comprising:
means for heating the adhesive layer by infrared radiation;
means for preheating the backing plate and adhesive layer at a separate location from and prior to said heating; and
means for pressing the backing plate with the adhesive layer onto a vehicle window surface.

23. Apparatus according to claim 22, wherein said heating includes:
means for placing the backing plate with the adhesive layer at a close spacing from the means for heating, wherein the means for heating is a heating device operable to emit infrared radiation, and means for operating the heating device to emit infrared radiation for a predetermined time period.

24. Apparatus according to claim 23, wherein said predetermined time period is less than one minute.

25. Apparatus according to claim 22, wherein said preheating includes use of infrared radiation.

26. Apparatus according to claim 22 comprising:

a storage container for storing at least one of said backing plates having an adhesive layer thereon, means for transferring said preheated backing plate to said means for heating, and means for transferring said heated backing plate to the means for pressing, wherein said means for preheating preheats said at least one backing plate while in said storage container, and whereby said bonding of said backing plate to a vehicle window can be rapidly carried out in an assembly line operation.

* * * * *